United States Patent

Feezor et al.

[11] 3,905,131
[45] *Sept. 16, 1975

[54] AUDIOMETRIC PRETEST TRAINER

[75] Inventors: Michael D. Feezor; Mack J. Preslar, both of Chapel Hill, N.C.

[73] Assignee: Audiometric Teleprocessing, Inc., Chapel Hill, N.C.

[ * ] Notice: The portion of the term of this patent subsequent to Feb. 19, 1991, has been disclaimed.

[22] Filed: Oct. 11, 1973

[21] Appl. No.: 405,677

[52] U.S. Cl. .................... 35/13; 179/1 N
[51] Int. Cl. ............................ G09b 25/00
[58] Field of Search........ 35/8 R, 1, 35 C, 13, 22 R; 128/1 R; 179/1 N, 1 SA, 1 SB, 1 VC, 1 VS

[56] References Cited
UNITED STATES PATENTS

| | | |
|---|---|---|
| 3,536,835 | 10/1970 | Rawls, Jr. et al. ................ 179/1 N |
| 3,561,138 | 2/1971 | Catlin et al. ........................... 35/13 |
| 3,623,241 | 11/1971 | Becker et al. .......................... 35/13 |
| 3,673,328 | 6/1972 | Grason et al. ...................... 179/1 N |
| 3,718,763 | 2/1973 | Cannon et al. .................... 179/1 N |
| 3,793,484 | 2/1974 | Feezor ............................... 179/1 N |

Primary Examiner—Robert W. Michell
Assistant Examiner—Vance Y. Hum

[57] ABSTRACT

In an audiometric pretest training device for training a hearing test examinee to correctly operate an automatic audiometer having an examinee control switch, an oscillator emits an audio test signal into a voltage proportional attenuating circuit and through sound transducer means which produces audible tones having controlled amplitude regulated by an operator switch.

9 Claims, 4 Drawing Figures

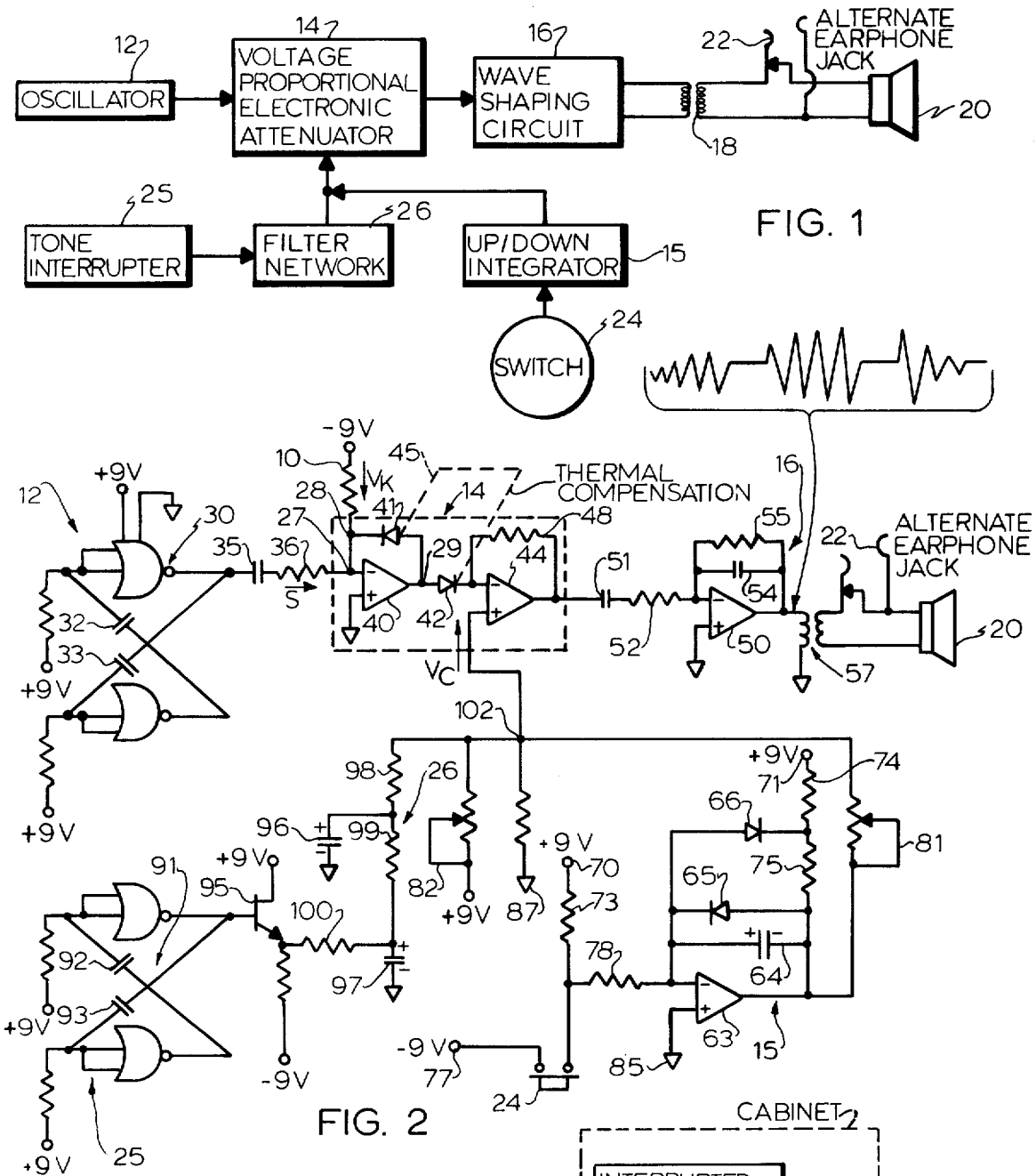
FIG. 1
FIG. 2
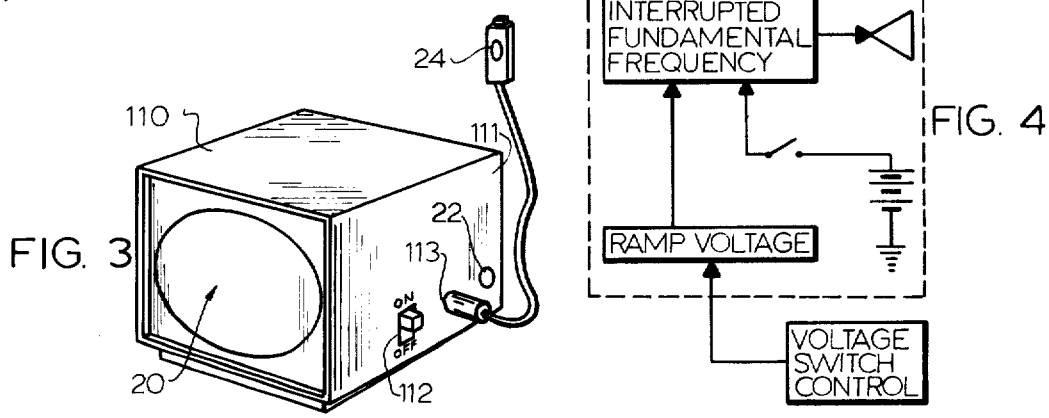
FIG. 3
FIG. 4

AUDIOMETRIC PRETEST TRAINER

CROSS-REFERENCE TO RELATED APPLICATIONS

This application is related to copending applications: Ser. No. 306,351, entitled "Programmable Audio Level Control Useful in Audiometric Apparatus"; Ser. No. 315,173, entitled "Precision Automatic Audiometer"; and Ser. No. 314,816, entitled "Computer Controlled Method and System for Audiometric Screening." The instant invention makes use of a voltage proportional attenuating circuit as described in the cited copending application, Ser. No. 306,351. The invention is related to the latter two cited copending applications, Ser. Nos. 315,173 and 314,816 in that both cited applications employ examinee operated control switch means.

BACKGROUND OF THE INVENTION

1. Field of the Invention:

This invention relates to training aids and simulators and particularly to audio training devices. More specifically, the invention relates to an audio training device useful in training a hearing test examinee to correctly operate an automatic audiometer having examinee operated control switch means. The device can be made as a lightweight, self-contained, portable device. 2. Description of the Prior Art:

Automatic audiometry can be defined as a self-administered hearing test. More accurately, it is a hearing test performed by an instrument designed to present automatically changing tone frequencies while the degree of sound intensity of the signal is controlled by the examinee, the entire test sequence being simultaneously recorded on a synchronously coupled automatic recorder. Examples include the Grason Stadler Corp. Model E-800 and the Tracor Electronics Corp. Model ARJ-4. Reference may also be made to the above cited copending applications, Ser. Nos. 315,173 and 314,816, which make use of the examinee operated switch means to control the sound intensity to which a particular hearing test examinee is exposed. The current need for mass audiometric testing created by recent occupational health and noise exposure regulations has led to the widespread use of such automatic audiometers.

One well-known testing scheme employed in automatic audiometers incorporates a redundant test tone which is repeated, partly to detect examinees attempting to cheat, but which also serves to detect examinees who, through lack of experience or proper instruction, are not able to perform the test properly. Several automatic audiometers provide a "hold" button which may be operated by a supervisor to temporarily stop the test and allow the examinee to practice until the supervisor determines that the examinee understands the test. In some cases where testing is limited to a few individuals use of such a "hold" button has been found satisfactory. When it is necessary to test large numbers of individuals, however, periodic stopping of the test sequence is impractical. It is especially impractical to stop a test sequence when testing a group of examinees simultaneously as may be accomplished by the above cited copending application Ser. No. 314,816. It would be desirable under such circumstances to allow one group of examinees to practice while another group of examinees is being tested. Due to the high expense of automatic audiometers, use of one audiometer for practice and one for testing is highly impractical.

Oscillator pulsing and shaping circuits have been used to produce periodically interrupted tone frequencies for warning and other purposes. An example is the "Sonalert" device made by the Mallory Corporation. However, such circuits, so far as is known, have never been applied in audiometric applications.

What has long been needed and what the prior art has failed to provide is a relatively inexpensive, compact, portable and self-contained audiometric training device which functions in the same manner as the automatic audiometer being used for testing, and which may be used exclusively for training examinees in the correct use of such audiometer, without utilizing valuable testing time of the audiometer.

SUMMARY OF THE INVENTION

The present invention is directed to a portable, self-contained, training device useful in teaching hearing test examinees the correct operation of an automatic audiometer and includes an oscillator, an examinee operated push-button switch, a voltage proportional solid state attenuator which is caused to increase or decrease sound intensity in response to operation of the examinee switch, an up-down-integrator which regulates the increase or decrease in sound intensity, a tone interrupter to pulse the tone if desired, appropriate filtering components and a loudspeaker. The waveform reaching the loudspeaker is in triangular form. This form is rich in harmonics which gives a wide spectrum which is desirable for training subjects who may have a hearing deficiency at some frequency but not necessarily at the same frequency. A phone jack output is also provided allowing use of standard audiometric earphones. Plugging in earphones automatically disconnects the loudspeaker enabling acoustically silent operation. The device is enclosed by a suitable cabinet which mounts an on-off switch to energize the circuit from an appropriate power supply which may be self-contained. The housing also mounts connectors which enable the examinee switch and earphones to be quickly connected and disconnected to the circuit contained in the cabinet.

Using the invention training device, a test subject listens for a test tone until it becomes audible at which time he presses the control botton. This action causes the sound level to decrease. Once the test tone is no longer heard, the examinee releases the control button and the sound level begins to increase, corresponding to conventional automatic audiometer operation. This procedure is repeated until the examinee understands when to operate his control button, and is able to correctly take a hearing test on an automatic audiometer. When using the device the examinee can be allowed to practice in an area acoustically isolated from the testing area using the loudspeaker, or in any area including the testing area, if desired, by using earphones.

DESCRIPTION OF THE DRAWINGS

FIG. 1 is a block diagram directed to the disclosed embodiment of the invention but without the power supplies to simplify the drawing.

FIG. 2 is a somewhat schematic diagram of an electronic circuit embodying the invention including the power supplies.

FIG. 3 is a perspective view of a preferred embodiment of the invention.

FIG. 4 is a more generalized block diagram of the invention.

DESCRIPTION OF THE PREFERRED EMBODIMENT

Referring to FIG. 1 in a preferred embodiment an oscillator 12 generates a square wave signal at predetermined frequency into a voltage proportional electronic attenuator circuit 14 previously described in the above cited copending application, Ser. No. 306,351. An up-down-integrator 15 controlled by an examinee operated switch 24 feeds a ramp ascending or descending voltage wave into attenuator 14 causing it to respectively decrease or increase the signal level output from attenuator 14. A wave shaping circuit 16 is used to amplify and convert the square wave signal to triangular waveform which is then applied by means of impedance matching transformer 18 to speaker 20. Alternately, a phone jack output 22 enables the transformed signal to be coupled to appropriate earphones (not shown). Note that phone jack output 22 is preferably adapted to disconnect loudspeaker 20 when said earphones are connected. A tone interrupter circuit 25 may be used to emit a modified square wave through a filter network 26 and into attenuator 14 in order to pulse said signal.

Referring now to FIG. 2 which schematically represents a circuit embodying the invention, oscillator 12 may comprise a NOR gate flip-flop 30 functioning as an astable multivibrator. Capacitors 32 and 33 regulate the frequency of flip-flop 30 which outputs a square wave signal having a frequency of 1,000 Hertz, for example. Resistor 36 and capacitor 35 provide impedance buffering between flip-flop 30 and attenuator circuit 14 (represented within dashed lines), as well as providing scaling for said output signal.

Attenuator 14 comprises a logarithmic converting circuit and an exponential converting circuit. The logarithmic converting circuit includes a first operational amplifier 40 which receives the said 1,000 Hertz square wave signal. A constant voltage supply $V_k$ provides current which flows through resistor 10 and enters computing amplifier 40 via junctions 27, 28. Computing amplifier 40 is adapted to compute the electrical sum of the input signal (S) voltage and the constant voltage $V_k$ in order to ensure that the magnitude of $S + V_k$ is always greater than zero prior to being logarithmically converted. Also included in said logarithmic converting circuit is a first diode 41 adapted to compute the logarithm of $S + V_k$. Diode 41 is arranged to shunt configuration around amplifier 40 and connects between junction 28 and the output lead of amplifier 40 at junction 29. The cathode end of diode 41 is oriented closest to junction 28. The resulting signal in logarithmically converted form enters an exponential converting circuit comprising a second diode 42 and second computing amplifier 44. The cathode end of diode 42 is oriented closest to the negative summing junction of amplifier 44. Control voltage $V_c$ is received by the positive summing junction of amplifier 44. The combined action of diode 42 and amplifier 44 effectively sums the control voltage $V_c$ with the previous sum $S + V_k$ and performs electrical exponentiation of the resulting sum $\log_{10}(S + V_k) + V_c$. Resistor 48, in shunt configuration around amplifier 44, determines the feedback current and overall gain of amplifier 44. Thermal compensation of diodes 41 and 42, which are preferably a matched pair, is accomplished by appropriate means, e.g., epoxy embedding as indicated by dashed lines 45. Alternately, a pair of diodeor logarithmic-transconductor-connected matched transistors having like functional qualities may be substituted for diodes 41, 42.

Continuing with the description, a preferably non-polar electrolytic capacitor 51 next receives the exponentially converted signal and removes unwanted low frequency direct current offset voltage from the signal. The resulting signal next passes through an impedance scaling resistor 52 and enters a wave shaping circuit 16. Circuit 16 includes a third operational amplifier 50 and is adapted to alter the wave shape of the input square wave signal to a triangular waveform by means of capacitor 54 and resistor 55 in shunt configuration around amplifier 50. Resistor 55 in addition determines the feedback current and overall gain of amplifier 50. A triangular waveform has been used in the instant invention because it is inexpensive to produce, while at the same time provides a pleasing tone. In addition, a triangular waveform is rich in harmonics and is easily discernible even to persons having impaired hearing at certain frequencies. The form is illustrated in FIG. 2.

The resulting signal now comprising a triangular waveform and having low frequency direct current voltage components removed, enters a suitable impedance matching transformer 57 and finally a loudspeaker 20 wherein the signal is acoustically reproduced. As previously mentioned a phone jack 22 is provided enabling connection of standard audiometric earphones for acoustically silent operation.

An up-down-integrator 15 provides an ascending or descending control voltage $V_c$ by integrating respectively a negative or positive input voltage and comprises a fourth operational amplifier 63 having a capacitor 64 and appropriate diodes 65, 66 arranged in shunt configuration. Capacitor 64 provides linear increase and decrease of supply voltage which is bounded in positive as well as negative directions by diodes 65 and 66 which assume opposite orientations. Push-button switch 24 determines whether the input voltage applied to integrator 15 goes "high," e.g., is coupled with positive voltage incoming from terminal 70 through resistors 73 and 78 when switch 24 is open, or whether the voltage applied goes "low," e.g., is coupled with negative voltage incoming from terminal 77, when switch 24 is momentarily closed. Resistor 78 serves to scale the resulting current applied to amplifier 63 in either case and determines the rate of progression or regression of the integral. A first trimming potentiometer 81 enables adjustment of the rate of attenuation, e.g., rate of increase or decrease in control voltage $V_c$. A control voltage rate of change corresponding to an attenuation rate of 5 dB/second is preferred. A second trimming potentiometer 82 enables minute addition of positive voltage to the control voltage $V_c$ for scaling the control voltage above zero volts. Scaling of $V_c$ is useful in setting the lower attenuator bound somewhat below the usual examinee threshold thus enabling an examinee practicing to approximate his threshold until he is well acquainted with the nature of the test and correct operation of the equipment.

Appropriate points of ground 85 and 87 maintain the correct circuit polarity. It should also be noted that the positive summing junctions of operational amplifiers 40, 50 and 63 are grounded due to the signal inverting characteristics of the operational amplifiers employed. It is particularly important to note that an attenuator circuit 14 of the type described herein and in above cited copending application, Ser. No. 306,351, is capable of providing linear proportional control of signal intensity expressed in decibels in response to the control voltage applied. In the particular circuit described herein the proportionality is inversely linear due to the inverting amplifiers employed. Thus, closing of switch 24 causes the control voltage to increase algebraically and the signal to decrease; opening of switch 24 causes the control voltage to decrease and signal to increase. Through alternate choice of non-inverting components known to those skilled in the art, the operation of switch 24 may be made opposite to that described above.

Continuing with the description, tonal interruption may be accomplished if desired through the use of tone interrupter circuit 25. Circuit 25 may comprise, for example, an astable multivibrator constructed of a NOR gated flip-flop 91 having a 2 Hertz frequency determined by cross-connected capacitors 92, 93. Transistor 95 is provided to boost the output 2 Hertz square wave signal. Filtering and slight modification of such 2 Hertz is required to obtain a controlled rise time for each cycle of said wave. It is important to note that a rise or fall time for tonal interruption which is too abrupt will be characterized by a distinct "click" which has been found objectionable. A rise time and fall time for tonal interruption at 20–50 milliseconds is preferred. Suitable filtering and control over rise time is obtained by the grounded resistor-capacitor filter configuration 26 shown, comprised of capacitors 96 and 97 and resistors 98, 99 and 100.

The above 2 Hertz modified square wave combines with the control voltage $V_c$ at junction 102. Each upward cycle of the 2 Hertz square wave decreases the 1,000 Hertz signal output, expressed in decibels, by 40 dB to provide an apparent interruption in the output 1,000 Hertz tone. The downward cycles of 2 Hertz square wave voltage restore the signal to normal decibel level.

Referring next to FIG. 3 the instant invention contemplates the use of a relatively small lightweight portable housing 110 to contain the described circuit components. Suitably, a power supply comprising two 9-volt transistor batteries, e.g., RCA-VS305 (not shown) may be included. Other power supply means may be adapted. A face portion of said housing 110 is used to mount speaker 20. An on/off switch 112 for energizing the circuitry and appropriate switch jack 113 and earphone jack 22 are mounted on a sidewall 111 of said housing. A suitable push-button switch 24 is manufactured by Switchcraft, Inc., 5555 Elston Avenue, Chicago, Ill., as Model No. 42206.

Preparatory to operating the invention training device, switch 24 will be connected, switch 112 will be closed, and the hearing test examinee will be instructed by a technician to listen for a tone either through speaker 20 or through earphones, if provided; when the tone is faintly heard to press the push-button switch provided; when the tone fades and can no longer be heard to release the push-button switch. The device is then switched on by the technician and the examinee begins practicing. Once the examinee learns when to operate his push button, he is sent on to actual testing on an automatic audiometer. Note that further instructions may be desirable to inform the examinee that several frequencies will be heard in the actual test. Examinees who are not able to satisfactorily learn the correct push-button operation, possibly due to substantial hearing deficiencies, may require referral and professional counseling by a certified audiologist.

Based on the above, this invention has provided a simple, inexpensive, and extremely effective means to teach a hearing test examinee the correct operation of an automatic audiometer without requiring use of such automatic audiometer or expending valuable testing time while an examinee practices. One advantage is the portability of the invention which can be taken and situated virtually anywhere as an adjunct portion of any audiometric testing site. Another advantage which will be recognized, particularly by audiologists, is the capability of acoustically silent operation of the invention when used with earphones. Thus, the same area used for testing can also be used for training without disturbing audiometric testing in progress.

What is claimed is:

1. An audiometric training device whose operation is audibly learned by the examiner's response to audio signal intensities heard and switch controlled by the examiner comprising, in combination:
   a. oscillator circuit means productive of a continuous audio frequency signal;
   b. first circuit means comprising logarithmic signal converting means coupled to said audio oscillator means for converting said audio signal to logarithmic form;
   c. control voltage source means adapted to produce an ascending and descending ramp control voltage which is controllable as to direction and having maximum and minimum values;
   d. second circuit means coupled to said first circuit and control voltage source means and comprising summing circuit means for summing said logarithmic converted signal with said control voltage, and exponential signal converting means adapted to convert said combined logarithmic converted and control voltage signal to exponential form;
   e. voltage control means coupled with said control voltage source and comprising a two position switch adapted in a first position to cause a change in control voltage corresponding to a decrease in audio signal intensity, and in a second position to cause an opposite change in control voltage corresponding to an increase in audio signal intensity;
   f. output circuit means coupled to said second circuit means and comprising an output signal conditioning amplifier and disconnectable loudspeaker means providing a source for said examinee to hear said signal intensity and to respond thereto by operating said two position switch;
   g. a direct current power source having a disconnect switch and connected to power all of the above mentioned means; and
   h. a portable cabinet mounting said loudspeaker means and enclosing said oscillator circuit means, said first circuit means, control voltage source means, second circuit means, output circuit means and said direct current power source.

2. An audiometric training device as claimed in claim 1 including earphone jack means mounted in said cabinet for coupling an earphone transducer with said output circuit means and including means to disconnect said loudspeaker means when an earphone is connected with said earphone jack.

3. An audiometric training device as claimed in claim 2 wherein said oscillator circuit means includes constant voltage supply means for producing an audio frequency signal of unchanging polarity and greater than zero volts.

4. An audiometric training device as claimed in claim 2 including tone interrupter means connected to periodically interrupt said audio signal.

5. An audiometric training device as claimed in claim 1 wherein said oscillator circuit means includes constant voltage supply means for producing an audio frequency signal of unchanging polarity and greater than zero volts.

6. An audiometric training device as claimed in claim 1 including tone interrupter means connected to periodically interrupt said audio signal.

7. An audiometric training device whose operation is audibly learned by the examinees response to audio signal intensities heard and switch controlled by the examinee comprising, in combination:
   a. oscillator circuit means productive of a continuous audio frequency signal having a fundamental frequency and including a harmonic spectrum;
   b. a voltage controlled attenuator connected to said oscillator circuit means;
   c. control voltage source means adapted to produce an ascending and descending ramp control voltage which is controllable as to direction and having maximum and minimum values, said control voltage source being connected to said attenuator to provide a control voltage therefor;
   d. voltage control means coupled with said control voltage source comprising a two position switch adapted in a first position to cause a change in control voltage corresponding to a decrease in audio signal intensity and in a second position to cause an opposite change in control voltage corresponding to an increase in audio signal intensity;
   e. a loudspeaker means connected to receive the attenuated signal from said attenuator and providing a source for said examinee to hear said signal intensity and to respond thereto by operating said two position switch;
   f. a direct current power source connected to power all of the above mentioned means;
   g. switch means for connecting and disconnecting said direct current power source; and
   h. a portable cabinet housing said oscillator circuit means, said voltage control means, said direct current power source and providing walls mounting said speaker means and switch means.

8. An audiometric training device as claimed in claim 7 including tone interruptor means connected to periodically interrupt said audio frequency signal.

9. An audiometric training device as claimed in claim 8 including connector means mounted in a wall of said cabinet means enabling said voltage control means to be connected and disconnected from said cabinet means.

* * * * *

UNITED STATES PATENT OFFICE
CERTIFICATE OF CORRECTION

Patent No. 3,905,131     Dated September 16, 1975

Inventor(s) Michael D. Feezor; Mack J. Preslar

It is certified that error appears in the above-identified patent and that said Letters Patent are hereby corrected as shown below:

Column 4, line 5, "diodeor" should be --diode- or--.

Column 6, line 24, "examiner's" should be --examinee's--.

Column 6, line 26 and line 27, "examiner" should be --examinee--.

Signed and Sealed this third Day of February 1976

[SEAL]

Attest:

RUTH C. MASON
*Attesting Officer*

C. MARSHALL DANN
*Commissioner of Patents and Trademarks*